No. 656,965. Patented Aug. 28, 1900.
J. N. GREEN.
POULTRY NEST AND HOVER.
(Application filed Jan. 11, 1900.)
(No Model.)
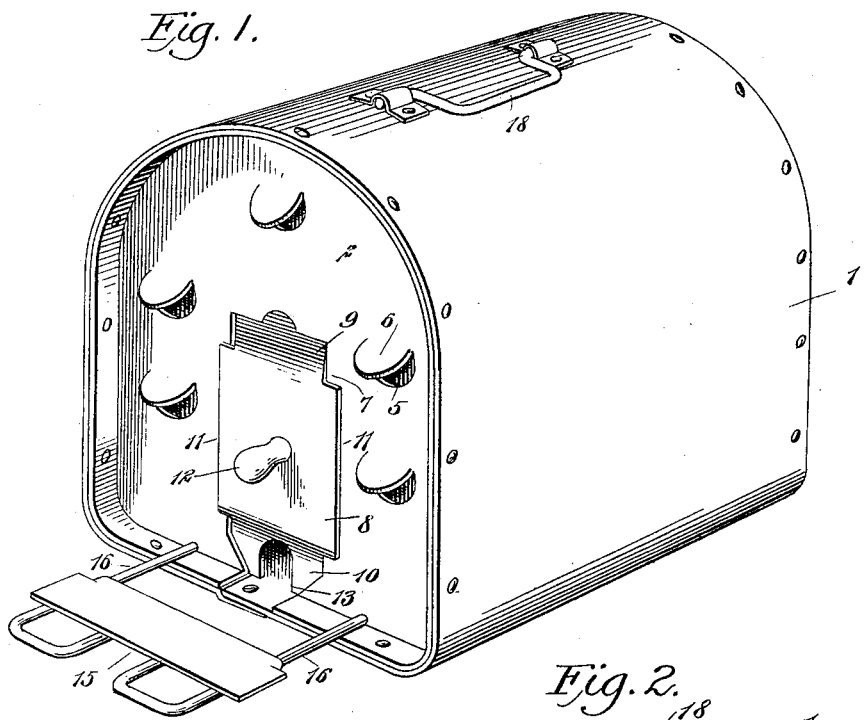
WITNESSES:
INVENTOR
John N. Green
BY
ATTORNEYS

UNITED STATES PATENT OFFICE.

JOHN NEWTON GREEN, OF NEWTOWN, KENTUCKY.

POULTRY NEST AND HOVER.

SPECIFICATION forming part of Letters Patent No. 656,965, dated August 28, 1900.

Application filed January 11, 1900. Serial No. 1,111. (No model.)

*To all whom it may concern:*

Be it known that I, JOHN NEWTON GREEN, a citizen of the United States, and a resident of Newtown, in the county of Scott and State of Kentucky, have invented a new and Improved Poultry Nest and Hover, of which the following is a full, clear, and exact description.

This invention relates to improvements in poultry nests and hovers; and the object is to provide a device of this character that shall be light and portable, that may be easily cleaned when necessary, that shall be well ventilated, and be comparatively cheap to manufacture. Other objects and advantages will appear further in the general description.

I will describe a poultry nest and hover embodying my invention and then point out the novel features in the appended claims.

Reference is to be had to the accompanying drawings, forming a part of this specification, in which similar characters of reference indicate corresponding parts in all the figures.

Figure 1 is a perspective view of a poultry nest and hover embodying my invention. Fig. 2 is a sectional side elevation thereof. Fig. 3 is a detail view showing one way in which the door may be arranged, and Fig. 4 is a detail view showing another way in which the door may be arranged.

The nest and hover comprises a body portion 1, consisting of a single sheet of metal and here shown as having a flat bottom, vertical sides, and a rounded top; but it is to be understood that I do not confine my invention to this particular form. Secured to the body portion is a front end wall 2 and a rear end wall 3, both consisting of sheet metal, and, as here shown, the end pieces have outwardly-extended edge flanges through which rivets are passed, the said rivets also passing through the metal of the body portion 1. The rear wall has openings 4 for the circulation of air and the front wall has openings 5 for the circulation of air, which openings 4 and 5 may be of any desired number and of any desired size, and to prevent the entrance of water through said openings downwardly-inclined water-sheds 6 are arranged at the upper sides of the openings, the said sheds being the metal stamped out to form the openings. The front wall is provided with a doorway-opening 7, in which a door 8 may be placed. This door 8 consists of metal, and it is held in place by means of depressed end portions 9 and 10, adapted to engage against the inner surface of the front end wall, while side portions 11 engage against the outer surface of the end wall, as plainly indicated in Figs. 1 and 2. The door is provided with a handle 12, and in one end, as here shown in the depressed end 10, an opening 13 is formed, which when the door is in the position indicated in Fig. 1 will permit chickens or young poultry to pass freely in and out, but will prevent the mother from passing out. When the door is reversed, so that the opening 13 is uppermost, it will, in connection with a semicircular notch 14 at the upper portion of the doorway-opening, form a circular opening, which will permit a certain amount of light and air to enter; but the small chickens or the like will be prevented from passing out, because of the solid depressed portion 9 being lowermost, as indicated in Figs. 2 and 3. When desired, the door 8 may be placed crosswise of the doorway and at the lower portion thereof, as indicated in Fig. 4, and the door will be prevented from lengthwise movement by means of its handle 12 engaging in the straw or other material of the nest, the handle being for this purpose turned inward.

The nest and hover is provided with a perch or step consisting of a platform 15, mounted on rods 16, passed through openings in the front wall 2 and movable through guides 17, arranged on the floor of the nest and hover. By this construction the perch or step may be adjusted inward or outward as convenience may require. This perch or platform may be omitted; but I preferably employ it when the nest and hover is suspended above the ground or floor, as indicated in Fig. 2, as it affords a place for the hen to fly upon before entering the doorway.

For convenience in carrying the device from place to place it is provided at its top with a handle 18.

As this device is made wholly of metal, it is obvious that it may be kept very clean in the following manner: After a hen or other fowl shall have laid her eggs and is about to set, the eggs may be removed and then the old nest set on fire. The burning of this nest will destroy insects or other foul matter in the nest and hover, after which new material may be placed therein for the setting-nest. After the fowl shall have finished setting, the setting-nest may be burned out, as before described, leaving the device perfectly clean. After hatching the device may have its door arranged, as shown in Fig. 1, to permit the chickens to pass out and in while the hen is prevented from passing out, as before described. When it is desired to permit the hen to go out for exercise or the like, the door may be reversed, as in Fig. 4, to keep the chickens in.

Another object in making the device of metal is that metal absorbs both heat and cold, which will keep a practically-even temperature within the device.

Having thus described my invention, I claim as new and desire to secure by Letters Patent—

1. A nest and hover, having a doorway-opening, through one of its walls, and a door having a greater length than width and having end pieces adapted to engage against the inner side of the hover-wall and side portions adapted to engage the outer surface of said wall, the said door being free and adapted to be placed lengthwise or crosswise of the opening so that an opening is provided above the door when crosswise, substantially as specified.

2. A nest and hover, having a doorway-opening through one of its walls, and a door having depressed ends for engaging against the inner surface of the wall and portions for engaging against the outer surface of said wall, the said door having an opening at one end, substantially as specified.

3. A nest and hover, having a doorway-opening in one of its walls, and a perch consisting of a platform, rods on which the platform is mounted, the said rods being movable through openings in the wall of the nest and hover, and guides arranged on the floor of the nest and hover through which said rods are movable, substantially as specified.

In testimony whereof I have signed my name to this specification in the presence of two subscribing witnesses.

JNO. NEWTON GREEN.

Witnesses:
THOMAS K. SHUFF,
ISHAM G. HAMILTON.